(12) United States Patent
Ankri et al.

(10) Patent No.: US 12,524,418 B1
(45) Date of Patent: Jan. 13, 2026

(54) SYSTEM, METHOD, AND COMPUTER PROGRAM FOR EXPLAINABILITY OF ENTITY DATA SEGMENTATION BASED ON BOOLEAN FRICTION POINTS

(71) Applicant: Amdocs Development Limited, Limassol (CY)

(72) Inventors: Marina Ankri, Karnei Shomron (IL); Boris Rabinovich, Kfar Saba (IL); Pavel Yefim May, Rishon leZion (IL); Vivi Miranda, Raanana (IL); Liad Levi-Raz, Kfar Neter (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 18/632,142

(22) Filed: Apr. 10, 2024

(51) Int. Cl.
*G06F 17/00* (2019.01)
*G06F 16/22* (2019.01)
*G06F 16/2458* (2019.01)
*G06F 16/28* (2019.01)

(52) U.S. Cl.
CPC ........ *G06F 16/2458* (2019.01); *G06F 16/221* (2019.01); *G06F 16/285* (2019.01)

(58) Field of Classification Search
CPC ... G06F 16/2458; G06F 16/221; G06F 16/285
See application file for complete search history.

(56) References Cited

U.S. PATENT DOCUMENTS

| | | | |
|---|---|---|---|
| 11,494,423 B1* | 11/2022 | Song | G06F 16/338 |
| 11,645,308 B2* | 5/2023 | Marvaniya | A01B 79/005 |
| | | | 707/737 |
| 2015/0269244 A1* | 9/2015 | Qamar | G06Q 10/10 |
| | | | 705/7.42 |
| 2022/0414523 A1* | 12/2022 | Khatibi | G06N 20/00 |

OTHER PUBLICATIONS

Susan Davidson et al., ShapGraph: An Holistic View of Explanations through Provenance Graphs and Shapley Values. In Proceedings of the 2022 International Conference on Management of Data. Association for Computing Machinery, 2373-2376, <https://doi.org/10.1145/3514221.3520172>, June (Year: 2022).*
Conceicao, "Supervised clustering with SHAP values," Instuto Superior de Economia e Gestao, Universidade de Lisboa, Mar. 2023, 37 pages.

* cited by examiner

*Primary Examiner* — Greta L Robinson
(74) *Attorney, Agent, or Firm* — Zilka-Kotab, P.C.

(57) ABSTRACT

As described herein, a system, method, and computer program provide explainability of entity data segmentation based on Boolean friction points. A dataset is processed, using a machine learning model, to calculate a plurality of Shapley values for the dataset, wherein the dataset includes friction points and explanatory variables. The dataset is clustered to generate a plurality of segments, based on the Shapley values. For each segment of the plurality of segments, a global explanation is generated for the segment using a predefined list of Boolean friction columns and the Shapley values.

16 Claims, 7 Drawing Sheets

Example of Calculating average of Shapley values per each Boolean friction points column in "B subset"

| | A | B | C | D | E |
|---|---|---|---|---|---|
| 1 | Friction points | fric point col 1 | fric point col 2 | fric point col 3 | fric point col 4 |
| 2 | Shapley values | 0.827995736 | 0.728823574 | 0.377069586 | 0.559998568 |
| 3 | Shapley values | 0.477354428 | 0.816365035 | 0.812701478 | 0.661217143 |
| 4 | Shapley Values | 0.582845389 | 0.756586373 | 0.448186189 | 0.285747587 |
| 5 | Shapley Values | 0.530134256 | 0.852632313 | 0.445681072 | 0.370928296 |
| 6 | Shapley Values | 0.330540459 | 0.987015627 | 0.735677936 | 0.56164377 |
| 7 | Shapley Values | 0.72956543 | 0.007879909 | 0.913842159 | 0.380647467 |
| 8 | Shapley Values | 0.591391515 | 0.390513 | 0.824265955 | 0.921008106 |
| 9 | Friction point average | 0.581403888 | 0.648545119 | 0.651060625 | 0.534455848 |

FIG. 4

| | Example of Final Global Segments |
|---|---|
| 1 | [fric point col 1, fric point col 3, fric point col 7, fric point col 2] |
| 2 | [fric point col 4, fric point col 10, fric point col 1] |
| 3 | [fric point col 10, fric point col 5, fric point col 1, fric point col 3] |

FIG. 5

SYSTEM, METHOD, AND COMPUTER PROGRAM FOR EXPLAINABILITY OF ENTITY DATA SEGMENTATION BASED ON BOOLEAN FRICTION POINTS

FIELD OF THE INVENTION

The present invention relates to explainability in machine learning.

BACKGROUND

For many business problems for which machine learning is applied, the mere prediction output by a machine learning model is not enough. One often needs to understand the reasons behind the prediction, for example to determine how to mitigate an undesirable prediction. To address this issue, explainability is oftentimes required for a prediction made using machine learning.

Currently there are solutions which provide global explainability, which gives a statistical overview. However, global explainability is not granular enough for practical mitigation of the unwanted predicted occurrences. Other solutions provide local explainability per instance. However, for local explainability, the quantity of the instances is often too large to address the explanation and to decide on a mitigation strategy for each instance separately.

In general, many of the attributes provided by explainability solutions may be unactionable such that a business user will not be able to do anything about them to provide the desired mitigation. Further, with local explainability those attributes often mask the actionable attributes making it very complicated and even impossible to figure out what one should act upon.

There is thus a need for addressing these and/or other issues associated with the prior art. For example, there is a need to provide explainability of entity data segmentation based on Boolean friction points.

SUMMARY

As described herein, a system, method, and computer program provide explainability of entity data segmentation based on Boolean friction points. A dataset is processed, using a machine learning model, to calculate a plurality of Shapley values for the dataset, wherein the dataset includes friction points and explanatory variables. The dataset is clustered to generate a plurality of segments, based on the Shapley values. For each segment of the plurality of segments, a global explanation is generated for the segment using a predefined list of Boolean friction columns and the Shapley values.

BRIEF DESCRIPTION OF THE DRAWINGS

FIG. 4 illustrates a data table showing the calculation of a mean of Shapley values per each Boolean friction points column, in accordance with one embodiment.

FIG. 5 illustrates an example of final global segments, in accordance with one embodiment.

DETAILED DESCRIPTION

Figure 1:
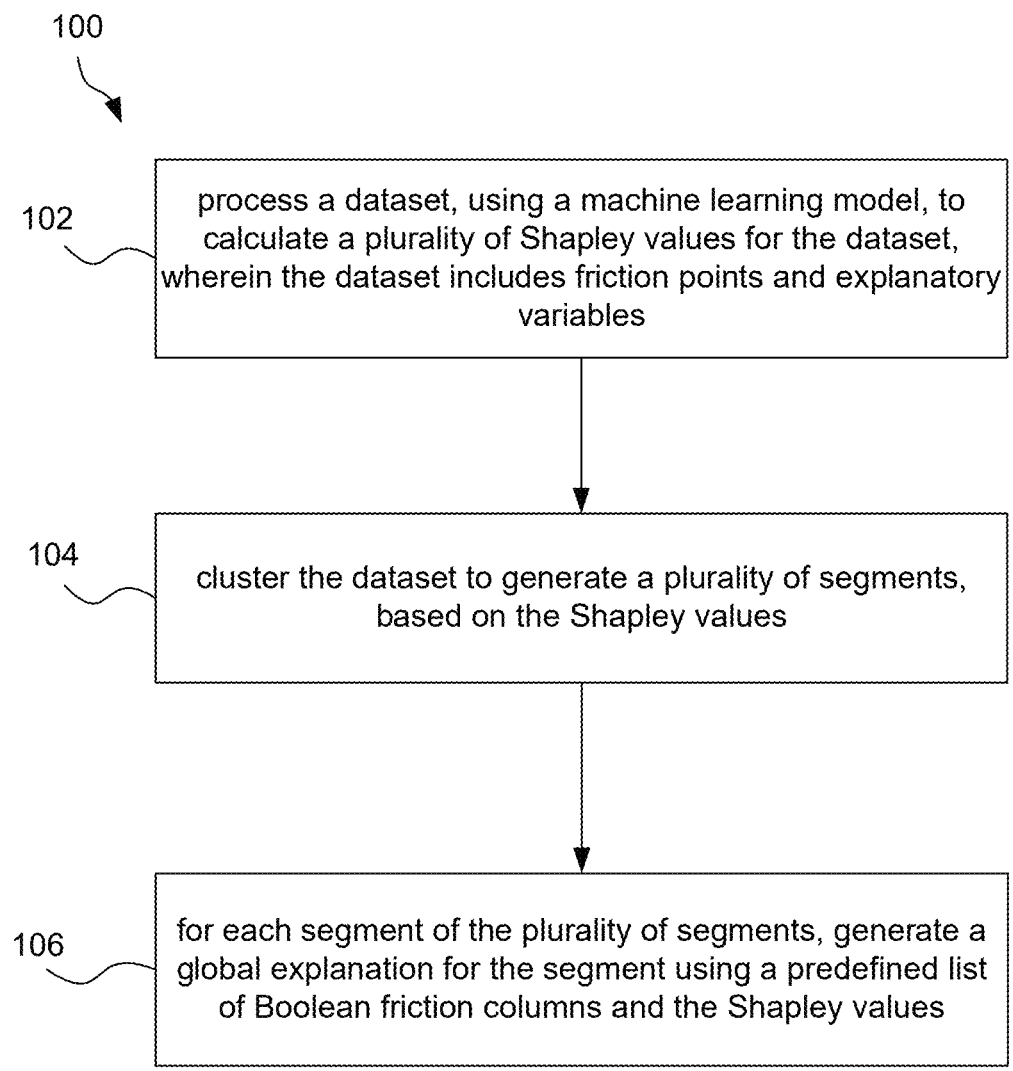
FIG. 1 illustrates a method for providing explainability of entity data segmentation based on Boolean friction points, in accordance with one embodiment.

FIG. 1 illustrates a method 100 for providing explainability of entity data segmentation based on Boolean friction points, in accordance with one embodiment. The method 100 may be carried out by a computer system, such as that described below with respect to FIGS. 6 and/or 7.

In operation 102, a dataset is processed, using a machine learning model, to calculate a plurality of Shapley values for the dataset, wherein the dataset includes friction points and explanatory variables. The dataset refers to any set of data entities having a plurality of attributes, such as values for a plurality of predefined parameters. As mentioned, the data entities include at least the friction points and explanatory variables. Friction points refer to key attributes, such as key events that mostly impact entity behavior or experience. Explanatory variables refer to independent variables or predictors, which may have some influence on a dependent variable (i.e. an outcome or response variable).

As mentioned, the dataset is processed by the machine learning model to calculate a plurality of Shapley values for the dataset. The machine learning model refers to a model that has been trained, using machine learning. In an embodiment, the machine learning model may be pretrained to calculate Shapley values for a given dataset. The Shapley values refer to an indication of a relative impact of each feature (or variable) of the data entities on an output of the machine learning model, which may be determined by comparing a relative effect of the inputs against an average.

In operation 104, the dataset is clustered to generate a plurality of segments, based on the Shapley values. In an embodiment, the dataset may be clustered after calculating the Shapley values. In an embodiment, the clustering may be performed on top of the Shapley values to determine the plurality of segments for the dataset. In an embodiment where the dataset includes a plurality of data entities, the plurality of segments may be generated from unique entity identifiers included in the dataset.

In operation 106, for each segment of the plurality of segments, a global explanation is generated for the segment using a predefined list of Boolean friction columns and the Shapley values. Thus, a global explanation may be generated for each of the segments generated in operation 104.

The global explanation refers to an overall or holistic understanding of how the machine learning model works and makes predictions across its entire decision-making process. As mentioned, the global explanation is generated for each segment using a predefined list of Boolean friction columns and the Shapley values. The Boolean friction columns refer to columns in a data structure corresponding to different Boolean friction points. The Boolean friction points are key events mapped to Boolean values that have been predetermined to mostly impact entity behavior or experience, for example, customer's experience in a telecommunications call center. In an embodiment, the predefined list of Boolean friction columns may be configured by a user. In an embodiment, the global explanation may be generated for the segment by highlighting a top number of most significant Boolean friction points based on the Shapley values.

In an embodiment, the global explanation may be generated for the segment by forming a first subset comprised of all data entities of the dataset that are included in the segment, forming a second subset comprised of Shapley values that are included in the segment, and processing the first subset and the second subset to generate the global explanation for the segment. In an embodiment, processing the first subset and the second subset may include, for the first subset, calculating a percentage of positive values for each of the Boolean friction columns, determining one or more of the Boolean friction columns where the percentage of positive values exceeds a predefined threshold percentage, for the second subset, calculating a mean of the Shapley values for each of the one or more of the Boolean friction columns, ordering the means calculated for each of the one or more of the Boolean friction columns, selecting a top number of the ordered means, and outputting an identifier of the segment with a top number of Boolean friction points. In an embodiment, all segments of the plurality of segments having a same top number of Boolean friction points may be combined.

In an embodiment, the global explanation generated for each segment of the plurality of segments is output. For example, the global explanation generated for each segment of the plurality of segments may be output for use in determining and performing an action to mitigate a situation. The situation may be predicted from the dataset, and the action to mitigate the situation may be determined based on the global explanation given per segment of the dataset.

In one exemplary embodiment, the dataset may include data for a plurality of customers of a service provider that is split into customer segments per a defined set of Boolean friction points. With respect to this exemplary embodiment, the global explainability determined per the method 100 for each of the customer segments may be used for a smart call deflection application.

In a further embodiment, for each data entity included in the dataset, a local explanation may be generated using the predefined list of Boolean friction columns and the Shapley values. The local explanation refers to an explanation of how the machine learning model makes individual predictions, which can be beneficial for determining which individual elements influence a particular choice. In an embodiment, the local explanation may be generated for the data entity by highlighting a top number of most significant Boolean friction points.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
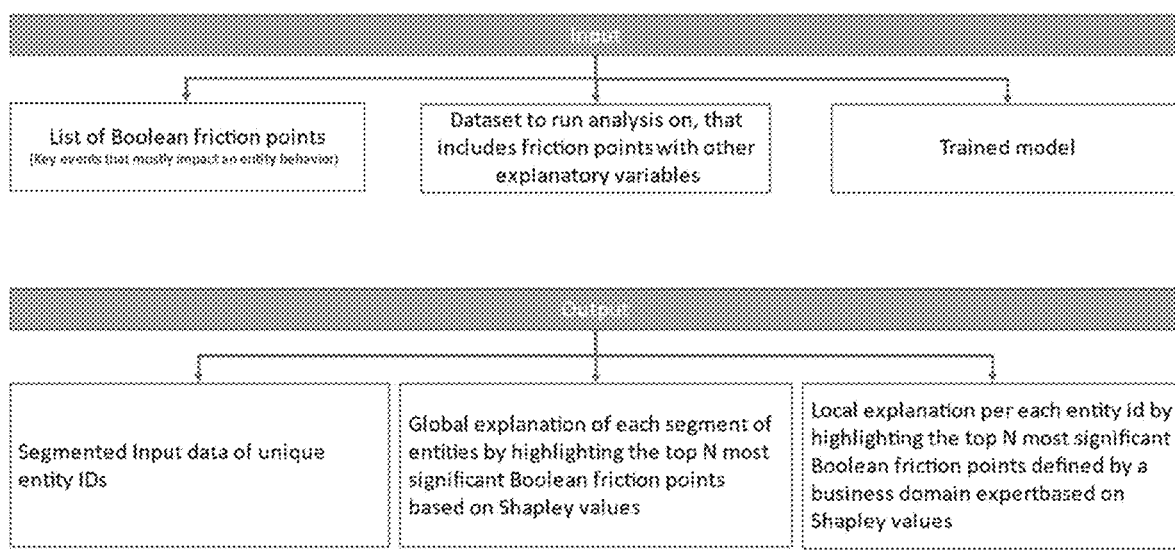
FIG. 2 illustrates a block diagram of the input and output of a method providing explainability of entity data segmentation based on Boolean friction points, in accordance with one embodiment.

FIG. 2 illustrates a block diagram of the input and output of a method providing explainability of entity data segmentation based on Boolean friction points, in accordance with one embodiment. The method may refer to the method 100 of FIG. 1. The aforementioned definitions may equally apply to the description below.

As shown, the input includes a predefined list of Boolean friction points, which may be manually defined. The input also includes a dataset to be analyzed. The dataset includes friction points and other explanatory variables. The input further includes a trained machine learning model.

The method is configured to use the machine learning model to process the dataset for calculating a plurality of Shapley values for the dataset. The method then clusters the dataset to generate a plurality of segments, based on the Shapley values. The method further generates a global explanation for each of the segments, using the predefined list of Boolean friction columns and the Shapley values.

As shown, the output of the method includes the segmented dataset by unique entity identifiers. The output also includes the global explanation of each segment, which in the present embodiment is the top N most significant Boolean friction points (per segment) as determined based on the Shapley values. The output further includes a local explanation for each entity identifier, which in the present embodiment is the top N most significant Boolean friction points (per data entity) based on the Shapley values.

Figure 3:
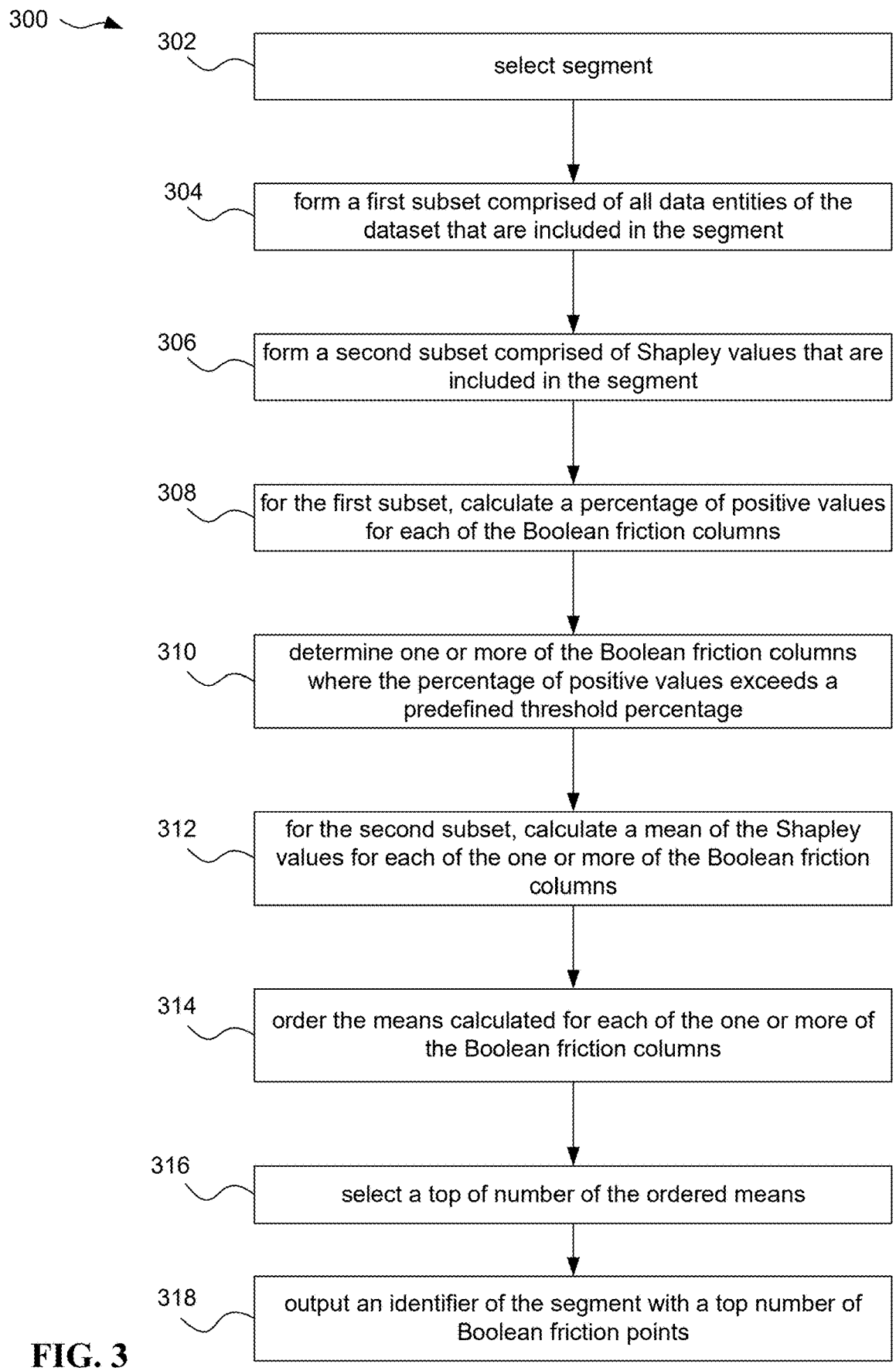
FIG. 3 illustrates a method for generating global explainability for a segmented dataset, in accordance with one embodiment.

FIG. 3 illustrates a method 300 for generating global explainability for a segmented dataset, in accordance with one embodiment. The method 300 may be carried out to perform operation 106 of FIG. 1, in an embodiment.

In operation 302, a segment is selected. The segment refers to one of the segments determined for a dataset, per a clustering algorithm applied to Shapley values calculated for the dataset. It should be noted that the method 300 may be repeated for each of the segments determined for the dataset.

In operation 304, a first subset is formed which is comprised of all data entities of the dataset that are included in the segment. In operation 306, a second subset is formed which is comprised of Shapley values that are included in the segment. In operation 308, for the first subset, a percentage (e.g. 50%) of positive values for each of the Boolean friction columns is calculated. In operation 310, one or more of the Boolean friction columns are determined where the percentage of positive values exceeds a predefined threshold percentage.

In operation 312, for the second subset, a mean of the Shapley values is calculated for each of the one or more of the Boolean friction columns (e.g. see FIG. 4 for example). In operation 314, the means calculated for each of the one or more of the Boolean friction columns are ordered. In operation 316, a top (predefined) number of the ordered means are selected. In operation 318, an identifier of the segment is output with a top number of Boolean friction points, which correspond to the selected/ordered means (e.g. see FIG. 5 for example).

SUMMARY

For many business problems, artificial intelligence-based prediction is not enough. One need to understand the reasons for the prediction and what actions should be taken to mitigate an undesirable prediction.

Prior solutions to this problem present:
Global explainability, that gives a statistical overview but is not granular enough for practical mitigation of the unwanted predicted occurrences; or
Local explainability per instance that has two downsides: (1) The quantity of the instances if often too large to address the explanation and to decide on a mitigation strategy for each instance separately. (2) Many of the attributes are unactionable such that a business user can do nothing about them. With local explainability those attributes often mask the actionable attributes making it very complicated and even impossible to figure out what one should act upon.

The embodiments described herein generate a new category midway between global to local explainability to address the business problem. The embodiments described herein enable entity segmentation based on Boolean friction points. The embodiments described herein provide a new type of explanation of each segment by highlighting the top N of the most significant Boolean friction points accompanied with a relation to top N of the most significant features. Further, the embodiments described herein allow data entities to be grouped into segments and provide actionable explanations per segment that a business user can act upon to efficiently mitigate the situation.

Exemplary Use Case—Telecommunications Client Bill Related Experience

A dataset is accessed which includes all the bill related information per month for each private client of a telecommunications company: plans, promotions, one time charges, amounts, debts, client history, paying method, etc. Based on expert knowledge, columns of Boolean friction points are engineered, including those known to cause dissatisfaction for some clients.

Clients are considered to have a bad experience if they called to complain about the bill or/and have churned. Here are a few examples of reasons for such experience: (1) amount over 30% larger than the average amount over last 3 months, (2) amount increase plus change in autopay bill status, or (3) end of promotion period.

A model is trained to predict if, based on data for a specific month, the client will be dissatisfied. However, this is not enough-to mitigate and improve the client experience, the personal reason for such experience must be determined. This is achieved by finding the Shapley values of each friction point and explanatory variable.

Having per client Shapley values is not enough, since telecommunications companies often have millions of clients, and it is impossible to handle each one personally. Therefore, the clients are clustered into groups with similar dissatisfaction reasons, and a mitigation technique is developed per cluster and is configured to improve the experience for all the clients in the cluster. This is accomplished by first clustering the clients based on their Shapley values and then finding the common friction points with high Shapley value for most of the clients in the cluster. Addressing those friction points is the key to improving the experience for the clients in the cluster.

Figure 6:
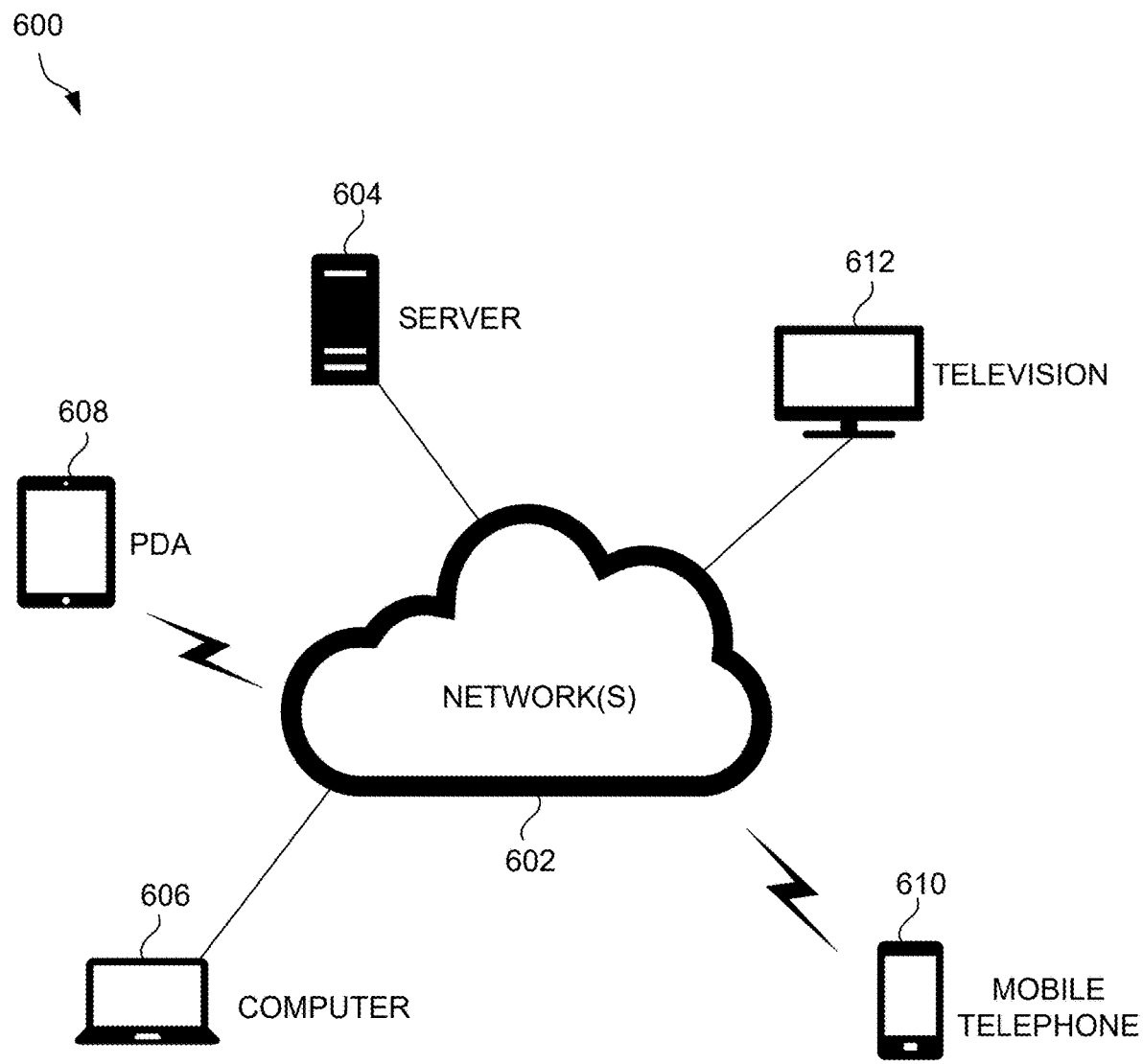
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
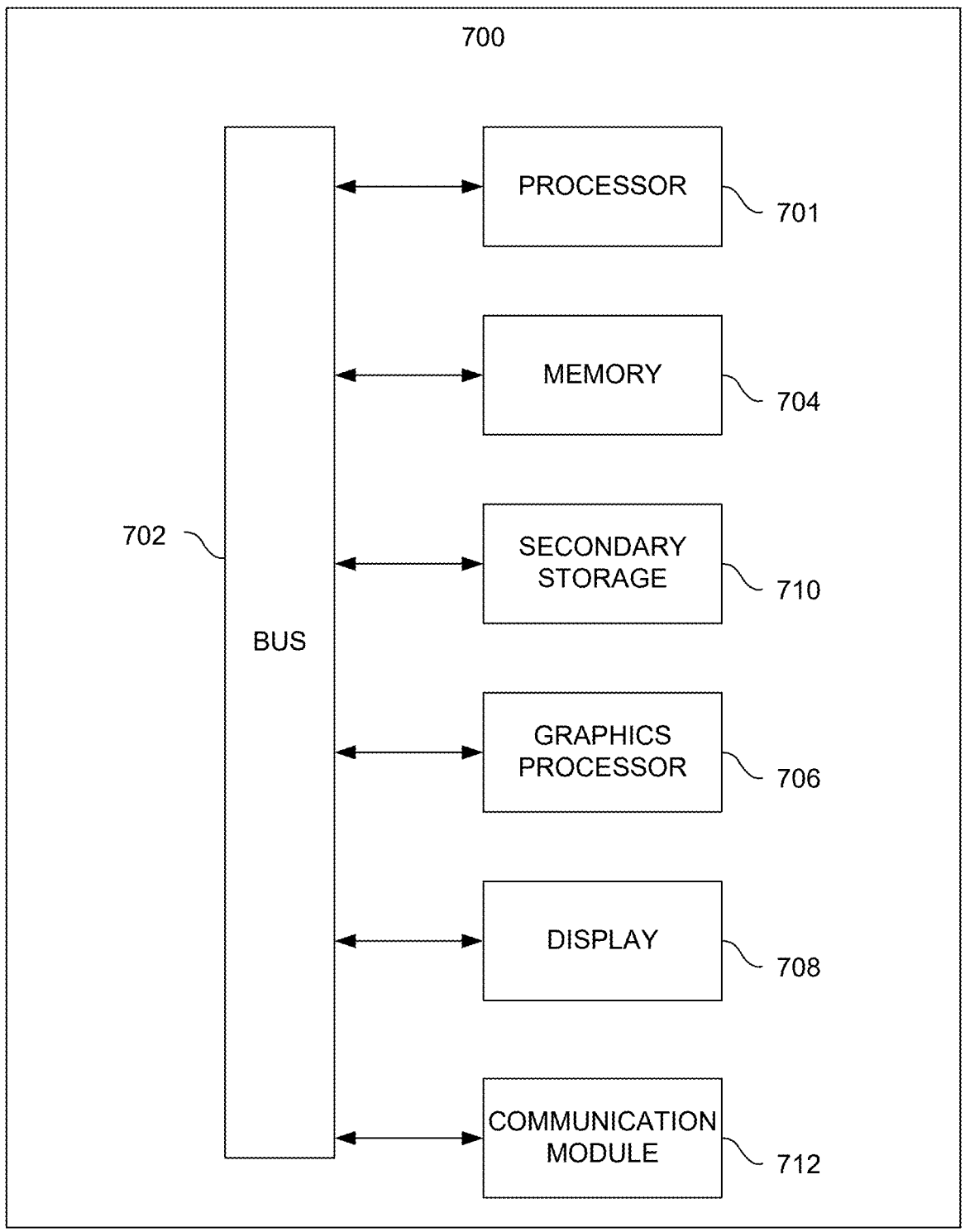
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments but should be defined only in accordance with the following claims and their equivalents.

What is claimed is:

1. A non-transitory computer-readable media storing computer instructions which when executed by one or more processors of a device cause the device to:
    process a dataset, using a machine learning model, to calculate a plurality of Shapley values for the dataset, wherein the dataset includes a plurality of friction points and explanatory variables;
    cluster the dataset to generate a plurality of segments, based on the Shapley values; and
    for each segment of the plurality of segments, generate a global explanation for the segment using the Shapley values and Boolean values stored in columns of a data structure that each represent a different predetermined friction point of a plurality of predetermined friction points, the global explanation highlighting a top number of most significant friction points of the plurality of predetermined friction points as determined based on the Shapley values.

2. The non-transitory computer-readable media of claim 1, wherein the dataset, the machine learning model, and the plurality of predetermined friction points are received as input.

3. The non-transitory computer-readable media of claim 1, wherein the plurality of predetermined friction points is configured by a user.

4. The non-transitory computer-readable media of claim 1, wherein the machine learning model is pretrained to calculate Shapley values for a given dataset.

5. The non-transitory computer-readable media of claim 1, wherein the dataset includes a plurality of data entities and wherein the plurality of segments are generated from unique entity identifiers included in the dataset.

6. The non-transitory computer-readable media of claim 1, wherein the global explanation is generated for the segment by:
    forming a first subset comprised of all data entities of the dataset that are included in the segment,
    forming a second subset comprised of Shapley values that are included in the segment, and
    processing the first subset and the second subset to generate the global explanation for the segment.

7. The non-transitory computer-readable media of claim 6, wherein processing the first subset and the second subset includes:
- for the first subset, calculating a percentage of positive Boolean values for each of the columns of the data structure,
- determining one or more of the columns where the percentage of positive Boolean values exceeds a predefined threshold percentage,
- for the second subset, calculating a mean of the Shapley values for each of the one or more of the columns,
- ordering the means calculated for each of the one or more of the columns,
- selecting a top number of the ordered means, and
- outputting an identifier of the segment with the top number of of most significant friction points of the plurality of predetermined friction points.

8. The non-transitory computer-readable media of claim 7, wherein the device is further caused to:
- combine all segments of the plurality of segments having a same top number of most significant friction points of the plurality of predetermined friction points.

9. The non-transitory computer-readable media of claim 1, wherein the device is further caused to:
- output the global explanation generated for each segment of the plurality of segments.

10. The non-transitory computer-readable media of claim 9, wherein the global explanation generated for each segment of the plurality of segments is output for use in determining and performing an action to mitigate a situation.

11. The non-transitory computer-readable media of claim 1, wherein the device is further caused to:
- for each data entity included in the dataset, generate a local explanation using the columns and the Shapley values.

12. The non-transitory computer-readable media of claim 11, wherein the local explanation is generated for the data entity by highlighting a top number of most significant friction points of the plurality of predetermined friction points.

13. The non-transitory computer-readable media of claim 1, wherein the dataset includes data for a plurality of customers of a service provider that is split into customer segments per the plurality of predetermined friction points.

14. The non-transitory computer-readable media of claim 13, wherein the global explainability for each of the customer segments is used for a smart call deflection application.

15. A method, comprising:
at a computer system:
- processing a dataset, using a machine learning model, to calculate a plurality of Shapley values for the dataset, wherein the dataset includes friction points and explanatory variables;
- clustering the dataset to generate a plurality of segments, based on the Shapley values; and
- for each segment of the plurality of segments, generating a global explanation for the segment using the Shapley values and Boolean values stored in columns of a data structure that each represent a different predetermined friction point of a plurality of predetermined friction points, the global explanation highlighting a top number of most significant friction points of the plurality of predetermined friction points as determined based on the Shapley values.

16. A system, comprising:
- a non-transitory memory storing instructions; and
- one or more processors in communication with the non-transitory memory that execute the instructions to:
- process a dataset, using a machine learning model, to calculate a plurality of Shapley values for the dataset, wherein the dataset includes friction points and explanatory variables;
- cluster the dataset to generate a plurality of segments, based on the Shapley values; and
- for each segment of the plurality of segments, generate a global explanation for the segment using the Shapley values and Boolean values stored in columns of a data structure that each represent a different predetermined friction point of a plurality of predetermined friction points, the global explanation highlighting a top number of most significant friction points of the plurality of predetermined friction points as determined based on the Shapley values.

* * * * *